3,194,856
METHOD OF PRODUCING DECORATIVE
SURFACE COVERING
Leon B. Palmer, Little Falls, N.J., assignor to Congoleum-Nairn Inc., Kearny, N.J., a corporation of New York
Filed Apr. 17, 1961, Ser. No. 103,590
The portion of the term of the patent subsequent to June 6, 1978, has been disclaimed and dedicated to the Public
5 Claims. (Cl. 264—76)

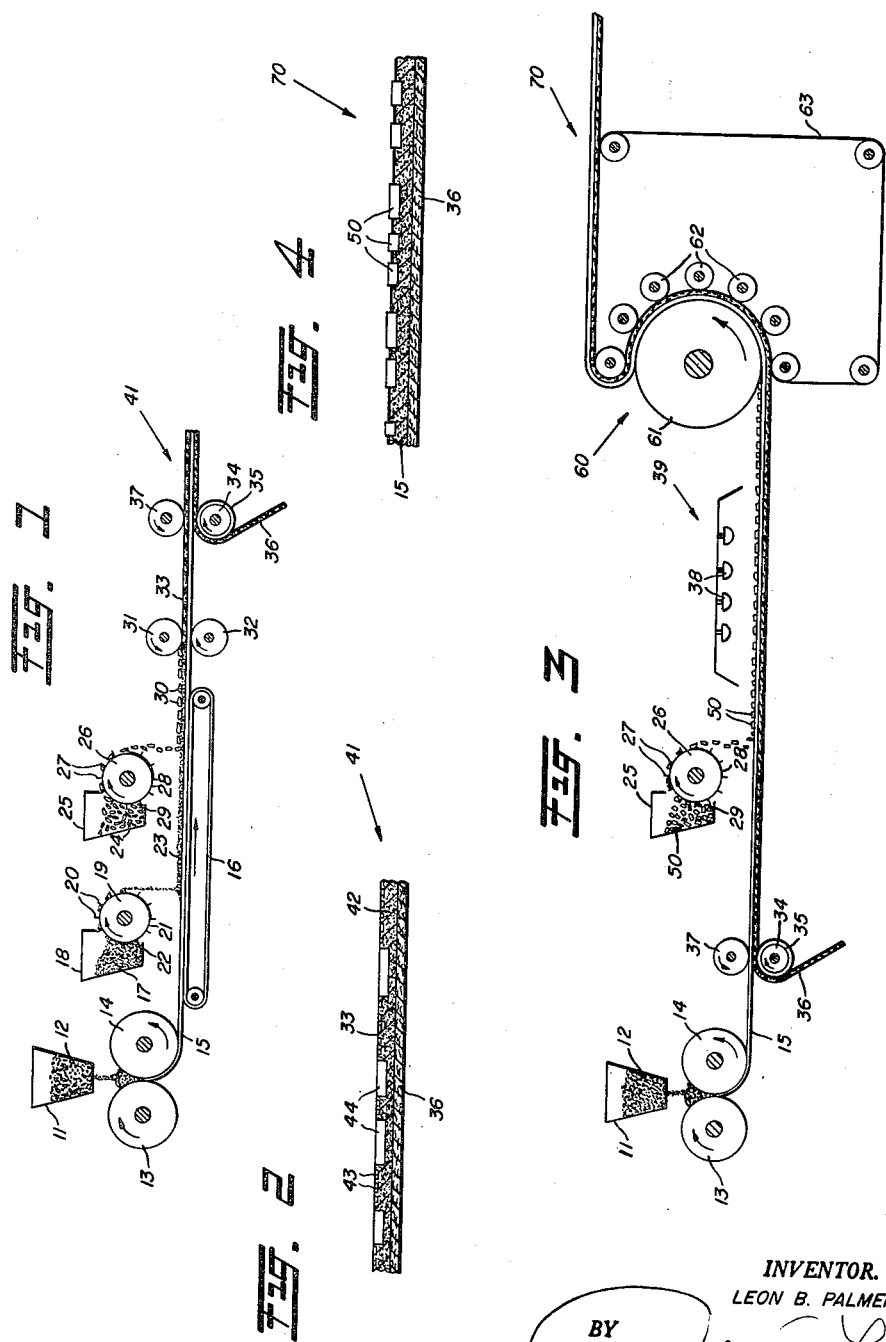

This invention relates to linoleum useful as a surface covering for floors, walls and the like and in particular to a method of creating non-directional decorative effects in a linoleum surface covering.

This application is a continuation-in-part of application Serial No. 705,653, filed December 27, 1957, now abandoned.

Linoleum is a well-known resilient surface covering which has been used for almost 100 years as a covering for floors, walls, articles of furniture and the like. Basically, the ingredients used in the production of linoleum today are similar to those in use when it was first discovered and, in general, comprise oxidized drying oils, resins, pigments and fillers. In the production of linoleum, a blend of these ingredients is sheeted by any one of a number of sheet-forming techniques, such as calendering and pressing. The composition sheet is bonded to a backing and finally is subjected to heat for extended periods of time to effect cure of the composition. Linoleum surface coverings are recognized as having long life and durability, good flexibility and resilience, as well as resistance to acids, alkalies and other soiling agents.

After the discovery of linoleum, it was initially produced primarily in the form of plain colored sheets. Although products of this type are manufactured today, they have been largely displaced by products with more intricate and appealing decorations. It was found at an early date that, if particles of colored linoleum composition were uniformly distributed in a mass of linoleum composition having a contrasting color, and then the resulting mass sheeted between calender rolls, attractive products could be produced. During calendering, the colored particles become distorted and smeared to yield long, colored streaks in the product. This effect is well known in the art as jaspe. Jaspe linoleum products are attractive and comparatively low in cost, but have the disadvantage that the decorative streaks penetrate only a small percentage of the thickness of the product. Thus, the decoration of the jaspe linoleum changes during wear after the product is installed. The colored streaks become cut and broken and, in some cases, disappear altogether.

Since the above described decorative effects are characterized by having long streaks of color the decoration has a pronounced directional characteristic. This effect is desirable in certain types of installations but there are areas and decorating schemes where a non-directional decorative effect is particularly desirable. A non-directional decorative effect can be produced by the technique known as geometric inlaid. In this method, sections of the desired shape are cut from the linoleum base sheet and the openings so formed are filled with cutouts taken from sheets of contrasting colors. The resulting composite sheet is calendered to fuse the components together. The decorative cutouts can take any desired geometrical form and thus the finished product can have a non-directional type of decoration. Since the decorative cutouts extend the full thickness of the base sheet, it is apparent that linoleum so produced has the desirable property that the decoration remains unchanged during wear. However, such products are expensive to produce. The equipment needed for producing geometric linoleum in commercial quantities represents the investment of several hundred thousand dollars. In addition, in some patterns the cutouts to be placed in the openings formed in the base sheet can represent as little as 10 percent of the total area of the sheet. The remaining 90 percent of the sheet used in forming the cutouts must be chopped up and resheeted. This large percentage of reprocessing adds materially to the cost of producing such products. A further disadvantage of this technique is that, for each geometric effect desired, expensive cutting cylinders and dies must be produced.

A popular type of non-directional decoration which is widely used in resilient floor coverings simulates terrazzo. Another type of non-directional decoration which has been created in linoleum simulates the appearance of a spatter design floor. This type of decoration was originally created by spattering a plurality of different colored paint compositions over a base paint color which had previously been applied to the floor. Both terrazzo and spatter design effects have been created in resilient floor coverings by depositing colored granular composition through carefully cut and aligned stencils upon a backing followed by consolidating the composition by molding in a flat bed press. The sheet can also be subsequently embossed to produce a two-level product. Although this method does create the desired non-directional effect, it has significant disadvantages. First, the stencils must be carefully aligned over the base sheet so that the different colored compositions will fall in exactly the proper location on the back which is normally saturated felt. If there is any misalignment of the stencils, areas of the backing remain uncovered by composition with the result that an unsatisfactory product is produced. Second, there is conventionally a separate stencil for each of the colors desired in the finished product. Thus, considerable manpower is required since individual batches of composition must be supplied to each stencil. Third, the use of a flat bed press results in a slow discontinuous operation with the result that processing costs are high.

It would be highly desirable to be able to create such non-directional decorative effects in linoleum using conventional calendering and finishing equipment in a continuous operation. Heretofore, attempts to do this have been unsuccessful. The depositing of linoleum composition in the form of decorative chips upon a linoleum composition base sheet followed by passing to the nip between calender rolls has invariably resulted in distortion and smearing of the decorative composition. The result is a product which has a highly directional appearance similar to the well known jaspe decorations of the prior art. In addition, attempts to embed linoleum composition into a linoleum composition base sheet result in tearing of the sheet due to strains which develop during the calendering process. These strains develop due to minute differences in the spacing between the calender rolls across the width of the sheet being calendered. It has been found virtually impossible to correct these minor differences in roll spacing through grinding of the roll surfaces. Even if a uniform roll spacing could be obtained, uneven wear of the roll surfaces would soon result in differences in spacing. Attempts to alleviate this problem by directly calendering a mass of granular material onto a saturated felt backing have also failed. The hard, relatively unyielding nature of the backing in comparison to the consistency of the linoleum composition results in extreme lateral spreading of the composition as it passes between the calender rolls. The result is a product having marked directional characteristics due to the distortion of the decoration.

It is an object of the invention to produce a non-directional decorative effect in linoleum in a continuous process. It is a further object of the invention to produce a non-directional decoration in linoleum by calendering granular linoleum composition without substantial distortion of the decoration developing. It is another object of the invention to provide a method of calendering granular linoleum composition onto a linoleum composition base sheet without the development of strains in the sheet during calendering. Other objects and the advantages of the invention will appear hereinafter.

In accordance with the invention a decorative linoleum composition sheet having a non-directional decorative effect is produced by depositing upon a linoleum composition base sheet granules of linoleum composition and passing the mass between calender rolls which are spaced apart a distance greater than the thickness of the base sheet, thereby forming a decorative sheet having the granules embedded in the surface of the sheet without substantial distortion of the granules.

The invention will be described with reference to the drawing wherein

FIGURE 1 is a schmatic representation of the production of a decorative linoleum composition sheet in accordance with one embodiment of the invention, FIGURE 2 is an enlarged cross-sectional view of the product produced by the method illustrated in FIGURE 1, FIGURE 3 is a schematic representation of the production of a decorative linoleum composition sheet in accordance with a second embodiment of the invention, and FIGURE 4 is an enlarged cross-sectional view of the product produced by the method illustrated in FIGURE 3.

With reference to the drawing, a hopper 11 is filled with finely divided multicolored linoleum composition 12 which is sheeted between calender rolls 13, 14 to form a base linoleum composition layer 15. The layer is carried from the calender rolls by means of a conveyor belt 16.

Finely divided multicolored linoleum composition granules 17 are maintained above the conveyor belt in a feed hopper 18. One side of the feed hopper is formed by a rotating drum, the circumference of which is provided with a plurality of evenly spaced projections 20 which extend the full width of the drum. The projections form a plurality of spaces 21. The drum is rotated at a uniform rate removing granules from the hopper in the spaces formed by the projections on the drum. The bottom of the feed hopper is provided with a resilient sealing member 22 which serves to prevent leakage of granules from the hopper. The granules fall from the side of the drum opposite to that in contact with the hopper upon the base sheet carried by the conveyor belt to form a layer of finely divided granular material 23. Decorative pieces 24 of linoleum composition in the form of coarse granular material are maintained in a feed hopper 25. The feed hopper is associated with a rotating drum 26 in the same manner as the hopper 18 is associated with drum 19. The circumference of the drum is provided with evenly spaced projections 27 which form space 28. A resilent sealing member 29 prevents leakage from the hopper. The pieces fall from the side of the drum opposite to that in contact with the hopper upon the layer of finely divided granules to form pieces 30.

The mass is carried by motion of the conveyor belt into the nip formed between calender rolls 31, 32 from which is removed a linoleum composition sheet 33 which has a greater thickness than that of the base sheet of linoleum composition. The sheet passes to a felt laminating unit formed of a lower roll 34 having a resilient cover 35 and an upper roll 37. A sheet 36 of impregnated felt passes over the resilient covered roll and contacts the linoleum composition sheet in the nip between the two rolls. The product 41 is ready to be stoved in the conventional manner following which it is ready for use as a linoleum surface covering.

With reference to FIGURE 2, the product in cross-section is made up of the decorative linoleum composition layer 33 and the felt backing 36. The linoleum sheet 33 is filled with interspersed areas of color as shown at 42 which result both from the finely divided linoleum composition 12 used to form the base layer, and also from the fine granular material 17. Some of the fine granular material is embedded into the surface of the sheet 33 as shown as areas 43. The decorative pieces 24 which are deposited upon the fine granules and then embedded into the base layer form areas of color such as those shown at 44 which penetrate deeply into the thickness of the sheet 33.

A second embodiment of the invention is shown in FIGURE 3 wherein a product is produced as shown in the cross-section of FIGURE 4 which is similar to the product shown in the cross-section 2, except that the decorative chips are raised slightly above the surface of the product so that it has a textured or embossed appearance. As a general rule in such a product, the chips should not extend above the surface for a distance greater than one-third the thickness of the chips to insure good knit of the product. The chips, therefore, preferably extend above the surface less than 0.009 inch with about 0.002 to about 0.004 inch being preferred. A hopper 11 is filled with finely divided linoleum chips 12 which are fed to calender rolls 13 and 14 and consolidated into sheet 15. A felt backing sheet 36 can then be laminated to the underside of the sheet 15 by passing to a felt laminating unit formed of a lower roll 34 having a resilient cover 35 and an upper steel roll 37.

Chips 50 of linoleum composition are maintained above the sheet 15 in a feed hopper 25. One side of the feed hopper is formed by a rotating drum 26 with a plurality of evenly spaced projections 27 which extend the full width of the drum. The projections form a plurality of spaces 28. The drum 26 is rotated at a uniform rate removing chips 50 from the hopper 25 in the spaces formed by the projections 27 on the drum. The bottom of the feed hopper is provided with a resilient sealing member 29 which serves to prevent leakage of chips 50 from the hopper 25. The chips 50 fall from the side of the drum 25 opposite to that of the hopper 25 upon the base sheet 15 passing below to form a single layer of chips. The base sheet 15 covered with the chips 50 can then, if desired, be passed through a heater generally indicated at 39 such as a bank of infrared lamps 38. The heater serves to raise the temperature of the base sheet 15 slightly in order to make it readily deformable. The heated sheet is then passed into a finishing unit generally indicated at 60 comprising a large drum 61 surrounded by a series of smaller pressure rolls 62. A rubber belt 63 passes between the smaller rolls 62 and the drum 61. The base sheet 15 covered with the decorative chips 50 is passed between the rubber belt and the drum whereby the decorative chips 50 are forced into the base sheet 15. The pressure exerted on the chips is limited so that they are not completely embedded in the base but project slightly above the base thereby producing a textured product. The finished sheet 70 is then ready to be stoved in the conventional manner following which it is ready for use as a linoleum surface covering.

The composition used to form both the decorative granular material and the base layer is any composition which is well known in the art as linoleum composition. Such a composition comprises a blend of oxidized and partially polymerized drying oils, resins, pigments and fillers. Any of the drying or semi-drying oils which are characterized by being oxidized and polymerized to a hard, tough consistency by the application of heat can be used. Such oils as linseed oil, soybean oil, China-wood oil, perilla oil and the like are typical drying oils used in the manufacture of linoleum. Suitable drying oils are characterized by being those in which oxidation yields a substantial amount of the oxidized glycerides of linoleic and linolenic acids. Synthetic drying oils, such as those derived from tall oil and other similar substances, can be used.

In the production of linoleum binder, the drying oils can either be partially oxidized alone and thereafter blended with suitable resins, followed by further oxidation, or the raw drying oils can be blended directly with resins and oxidized in a single stage. The resinous material used is conventionally rosin or its derivatives, such as ester gum and the like; but other resinous materials, such as congo ester, coumarone resins, kauri gum, synthetic resins of the phenol-formaldehyde type and the like can be used. During the oxidation process, it is conventional that small proportions of metallic dryers, such as the metallic salts of lead, manganese and the like, be used.

At the conclusion of the oxidation, which by the single stage process normally requires from 12 to 30 hours at a temperature of 180° F., the mass of oxidized drying oil and resin is withdrawn from the kettle in the form of a rubber-like gel. This mass, after being cooled, is mixed with pigments and fillers to produce the linoleum composition. The filler content will normally comprise a mixture of vegetable fillers, such as cork, wood flour and the like and mineral fillers, such as whiting, clay, asbestos and the like. The composition is pigmented using conventional organic or inorganic pigment, according to the particular color desired. Conventional linoleum compositions will normally comprise from 25 percent to 50 percent by weight of a blend of drying oil plus resin (normally referred to as linoleum binder) and from 50 percent to 75 percent by weight of pigments and fillers. The resin content of the linoleum binder is normally between 15 percent and 35 percent by weight of the amount of drying oil plus resin.

Linoleum composition formulated as described above is formed into a sheet by any of the techniques of sheet formation such as calendering or pressing. The sheet so formed becomes the base sheet upon which granular composition is deposited and into which the deposited composition is embedded in accordance with the invention. The base sheet can be formed in any of the conventional decorative effects in accordance with well-known techniques of the prior art, that is, the base sheet can be a plain colored sheet or can be in the form of a jaspe or marbleized decorative sheet. It is particularly effective, however, for the base sheet to be formed as a granite-type decoration, since in this way the decorative characteristics of the finished product will remain substantially unchanged as the product wears.

In the preparation of the granite-type decoration, the linoleum composition is ordinarily formed as fine multi-colored granules. The colors chosen are preferably the same as the colors desired in the wearing surface of the finished product. Granulated linoleum composition is most conveniently prepared by passing hot sheeted composition over the surface of a roll from which granules are gouged by a plurality of pins. This technique known as scratching is well-known in the linoleum manufacturing art and the granular material so produced is known as scratch. In the preparation of a granite effect base sheet for use in the invention, multicolored scratch composition is formed into a sheet between relatively cold calendar rolls. The front calender roll has a temperature between about 40° F. and about 100° F. and the back roll is somewhat warmer with a temperature between about 90° F. and about 130° F. Under these conditions, a multicolored sheet is produced having a fine granite-type appearance. Where it is desired that the base sheet have a minimum of directional characteristics in the decorative effect, one or both of the calender rolls can be kept clean in accordance with the procedure described in U.S. Patent No. 2,624,068, which issued on January 6, 1953 to Joseph F. Dobry. A base sheet having a granite effect can also be produced by molding fine scratch composition in a press. However, the use of calender rolls is particularly desirable since calendering affords a method of producing the base sheet continuously.

In the production of products in accordance with the invention, it is essential that the base sheet be thinner than the final linoleum composition sheet produced. The base sheet is preferably about 5 to about 20 mils thinner than the finished linoleum composition sheet with a range of about 7 to about 15 mils thinner being particularly effective. Linoleum is conventionally made with a decorative wearing surface having a thickness in the range of 0.032 to 0.125 inch. Most linoleum, however, is produced having a wearing surface with a thickness of about 0.050 inch which is referred to as standard gauge linoleum. In the production of linoleum, the decorative sheet produced is normally somewhat thicker than the ultimate product gauge desired in order to compensate for small amounts of gauge reduction in the finishing unit and to compensate for slight shrinkage of the composition sheet during cure. In the production of standard gauge linoleum, the decorative sheet produced in the sheet-forming process normally has a thickness of about 0.050 inch. Therefore, in the production of standard guage linoleum in accordance with the invention, the base sheet should have a thickness of about 0.030 to about 0.045 inch with a range of 0.035 to 0.043 inch being particularly effective. It is apparent, however, that the invention is also applicable to the production of decorative linoleum composition sheets having a thickness different from that used in normal standard gauge linoleum production.

In accordance with the invention, decorative linoleum composition granules are distributed on the surface of a base sheet in the form of regular or irregular pieces. Preferably, the decorative composition should be scattered on the surface of the base sheet which shows the least direction. When the base sheet is produced by calendering the surface showing the least direction will be usually the surface formed in contact with the cooler of the calender rolls. In one embodiment wherein granules of two distinct sizes are used, the fine granular linoleum composition is preferably in the form of scratch with a particle size range in the order of 0.02 to 0.06 inch in maximum dimension. The scratch is prepared in a blend of colors in accordance with the desired decorative effect and as described above, the color blend is preferably compatible with or equivalent to the color blend used in the preparation of the base sheet. The scratch composition scattered upon the base sheet in accordance with the invention can be prepared from composition having a lower binder content than the composition used to form the base sheet. Also, the scratch composition can be aged for a few days which serves to minimize distortion and direction during the subsequent embedding operation. Also, the scratch can be formulated to produce a harder composition such as by using less binder.

In this embodiment, the multicolored scratch composition blend is scattered as a thin uniform layer over a surface of the base sheet, preferably the scratch will cover from 75 percent to 100 percent of the surface area of the base sheet. Any of the techniques adapted to obtaining a fine uniform distribution of granular material can be used to deposit the scratch composition upon the base sheet.

The rotating drum type feeder illustrated in FIGURE 1 is particularly adapted to uniform feeding of linoleum composition. The speed of rotation can be synchronized with the rate of motion of the base sheet to insure uniform application of scratch composition. Other types of feeders can also be used such as vibrating feeders, shaking feeders and the like. It is essential, however, that the particular feeding device used be capable of distributing a thin uniform layer of scratch composition upon the surface of the base sheet.

After the fine scratch composition has been deposited upon a surface of the base sheet, the larger pieces or chips of linoleum composition are then applied to the layer of fine scratch composition. In order to obtain the desired terrazzo or spatter design decorative effect, these chips should be considerably larger in surface area than the scratch composition applied to the base sheet.

The chips can be formed in any desired geometric shape, such as squares or rectangles, but irregular shapes produce very unusual effects. The chips will normally be from about 0.10 to about 1 inch in maximum dimension with a range of about ⅛ inch to about ½ inch being particularly effective. The chips can be formed from coarse scratch composition having the desired size range or can be cut or broken from linoleum composition sheets. In order to minimize distortion of the chips during the subsequent embedding step the composition used can have a lower binder content that that of the base sheet composition or the chips can be aged for several days prior to use in order to increase their hardness. A percentage penetration of about 14% to about 22% for the composition of the chips is particularly effective. This is in comparison to a base sheet having a percentage penetration of over 22% to about 40% or even higher. Usually, the chips should have a percentage penetration of at least 25% higher than the base sheet. The chips should have substantial thickness in order that they can be embedded deeply into the decorative wearing surface of the finished product. Thus, the chips should be from about 0.75 to about 2 times the thickness of the base sheet with a range of about 1.0 to about 1.5 times the thickness of the base sheet being particularly effective.

The chips are scattered on the uniform layer of scratch composition to cover about 1 to about 20 percent and preferably about 2.5 to about 10 percent of the surface area thereof when used with the finer granules. When the chips are used without the fine granules, a covering of up to about 90 percent can be obtained with from 60 to 80 percent being preferred. The actual coverage depends mainly on the particular decorative effect desired. The chips should preferably be prepared in a number of colors for novel results.

It is essential that the chips be scattered uniformly over the base sheet. Any techniques of feeding which are adaptable to the uniform distribution of linoleum composition can be used. The rotary drum feeder illustrated in FIGURE 1 is a particularly effective type of feeding device but other types of feeders can be used such as vibrating feeders and the like. The chips can, if desired, be combined with the fine scratch composition and feed upon the surface of the base sheet in a single feeding operation. It is more desirable, however, to use separate feeders in order that the pieces are uniformly distributed over the layer of fine scratch composition.

The base sheet having the decorative composition uniformly deposited upon a surface thereof is then passed between spaced calender rolls in order to embed the decorative composition into the base sheet and consolidate the mass into an integral linoleum composition sheet. The calender roll which engages the decorative composition should preferably be chilled in order to minimize distortion of the decorative composition being embedded. A temperature range for this roll of 40° F. to 90° F. is desirable, although higher temperatures can be utilized. The roll which engages the back of the base sheet is usually heated to a relatively high temperature in the range of about 150° F. to about 275° F. The spacing between the rolls should be adjusted in accordance with the desired product gauge. As discussed above, in the production of standard gauge linoleum, the roll spacing should be about 0.050 inch. This spacing should be about 5 to about 20 mils greater than the thickness of the base sheet with a spacing of 7 to 15 mils greater than the thickness of the base sheet being particularly effective. If the sheet is on a felt backing during the embedding procedure, the apparent spacing of the rolls can be somewhat less due to compression of the felt. In addition, the linoleum composition can have a spring-back as high as 30 percent as it passes from the calender rolls which would also affect the spacing of the rolls.

In the passage of the sheet having the decorative composition deposited upon a surface thereof between the rolls, the chips become deeply embedded into the sheet produced. When using the fine scratch composition, it is consolidated into and on top of the base sheet to form an integral decorative linoleum composition sheet. In some instances, a light pressure can be applied to the decorative composition which have been deposited upon the base sheet prior to the embedding and consolidation. This light application of pressure is particularly desirable where the base sheet must pass either upwards or downwards in order to enter the nip between the calender rolls. In these cases, the light application of pressure serves to bond the composition to the base sheet so that they do not slide or fall off the base sheet during its passage to the calender rolls. However, where the calender rolls are so placed that the base sheet can travel horizontally into the nip, this light application of pressure is not necessary.

It is a significant feature of the invention that decorative composition is embedded into the base sheet without appreciable distortion in the shape of the composition. In addition, the embedding is carried out without the development of tensions in the base sheet which, should they occur, might result in tearing of the sheet during its passage through the embedding calender. A linoleum composition sheet, particularly when hot, is weak and thus any non-uniform tensions developing across the width of the sheet can readily result in tearing or breaking of the sheet. Tensions in the base sheet and distortion in shape of the decorative composition are eliminated in accordance with the invention by eliminating any gauge reduction of the base sheet during its passage through the embedding calender. In the passage of sheet material through a calender, an effective means of determining gauge reduction in the sheet is a comparison of the speed of sheet motion before and after the calender. Where the speed does not change, there is no gauge reduction as the sheet passes between the calender rolls. In accordance with the invention, the difference between the thickness of the final decorative sheet and the base sheet is adjusted in accordance with the volume of decorative composition scattered upon the base sheet and embedded therein. It is essential in carrying out the method of the invention that there be substantially no change in the speed of the sheet as it passes through the embedding calender. This condition of no change in speed indicates that there is no reduction in the gauge of the base sheet as it passes through the embedding calender. In actual practice, minor changes in sheet speed can result but the sheet leaving the embedding should not travel at a speed which is more than 10 percent faster than the speed of the base sheet feeding the calender. It has been found that where there is an increase of more than 10 percent in sheet speed, bagginess and tensions develop in the base sheet with the result that the base sheet tears as it passes through the calender.

The decorative linoleum composition sheet leaving the embedding calender has decorative pieces of linoleum composition embedded deeply into the thickness thereof. The depth of penetration normally ranges from 40 percent up to 90 percent of the thickness of the sheet. The placement of the embedded pieces over the surface area of the sheet corresponds to the placement of the pieces upon the fine scratch composition layer deposited upon the base sheet. The fine scratched composition is also embedded into the surface of the sheet and blends with the multi-colored composition used in forming the base sheet. Thus, the color characteristics in the product are maintained as the product becomes worn after installation. The embedding occurs without substantial distortion in the shape of the pieces with the result that the decorative linoleum composition sheet has a non-directional appearance. This appearance is remarkably similar to decorative effects which heretofore have been obtainable only by depositing linoleum composition in different colors through stencils followed by molding in an intermittently-operated flat bed press.

The fine scratch composition deposited upon the base sheet as a thin layer serves a two-fold purpose. First, the fine granules are embedded into the base sheet, thereby minimizing the effect of any directional characteristics in the base sheet decoration. This is an essential feature of obtaining the desired non-directional appearance in the finished product. Second, the layer of fine scratch composition serves to markedly reduce distortion in the shape of the decorative pieces embedded into the base sheet. As a piece is forced into the hot linoleum composition base sheet heat transfer from the sheet to the piece tends to soften it. There is, therefore, a tendency for the piece to become distorted. However, the layer of fine scratch composition forms a matrix which surrounds the piece and serves to preserve the shape of the piece as it is forced into the base sheet. In the absence of the layer of fine scratch composition distortion in shape of the pieces embedded into the base sheet can cause marked directional characteristics in the appearance of the product. If the fine scratch layer is not used, it is preferred to embed the pieces with as little lateral force as possible. A finishing unit such as illustrated in FIGURE 3 is particularly suitable for such embedding.

The base sheet serves as a soft resilient base into which both the fine scratch and decorative pieces are embedded. The presence of a linoleum composition base sheet is essential in the production of products in accordance with the invention. If one attempts to deposit a layer of fine scratch composition and decorative pieces upon a firm backing such as impregnated felt, distortion and direction develops in the product with the result that it does not have the desired non-directional characteristics.

Linoleum composition in sheet form must be bonded to a strengthening backing prior to cure of the composition to produce finished linoleum. The backing is an essential element in the finished product since it imparts to the product the ability to withstand strains resulting from handling the product during installation. In addition, the backing is necessary since uncured linoleum composition is relatively weak and soft and linoleum composition sheets hung in curing ovens without a backing would invariably tear and break. Backings of woven fabric, such burlap, cotton and the like, or felted fibrous sheets are well-known in the linoleum art. Felted fibrous sheets, prepared from fibrous materials on a web-forming machine, such as a Fourdrinier or cylinder machine, are ideal backing sheets for linoleum if impregnated with a water-proofing and strengthening saturant. Such saturants as asphalt, thermoplastic resins such as polyvinyl acetate, coumarone and the like, elastomeric resins, such as rubber, butadiene-styrene copolymer, polymerized chloroprene and the like, and thermosetting resins, such as phenolformaldehyde resin, oxidized natural and synthetic drying oils and the like can be used. The decorative sheet leaving the embedding calender is laminated to a backing by contact with the backing between pressure rolls. Lamination can also be brought about in a flat bed press but continuous lamination of the decorative sheet to the backing is particularly effective.

If the base sheet and the decorative chips, granules or scratch are at different temperatures at the time of embedding, it can result in the formation of small bulges in the surface of the base sheet which bears the decorative pieces. This is due to thermal expansion of the chips after embedding. If this occurs, the sheet can be subjected to a further pressing step after the pieces have been embedded therein. Prior to this final pressing, the sheet is preferably heated to a temperature between about 120° F. to about 140° F. The heated sheet is then passed beneath a pressing surface. The final pressing can be carried out between calender rolls or in a flat bed or rotary press. It is preferred that the pressing surface which engages the decorative surface of the product be maintained at normal room temperatures, that is between about 50° F. and about 90° F.

The product is then stoved or cured in the manner conventional in the manufacture of linoleum surface coverings. Conventionally, the product is hung in long loops in large ovens or stoves and gels at a temperature of about 140° F. to about 180° F. for a period of about three to six weeks. The cured product, removed from the stove, can be used in the form of sheets or can be cut up into tiles or other appropriate shapes as desired. After cure, the product can be bonded to a resinous foam backing, such as foam rubber or foam vinyl resin where a product with high resilience is desired.

The following examples are given for purpose of illustration:

Example 1

A mixture of 75 parts linseed oil and 25 parts rosin was agitated in a kettle in the presence of air at a temperature of 180° F. until it became a rubber-like gel to form a linoleum binder. Batches of linoleum composition were prepared in different colors, each batch having the following composition:

| | Percent by weight |
|---|---|
| Linoleum binder | 37 |
| Wood flour | 29 |
| Pigment and filler | 34 |
| | 100 |

Each batch was milled and scratched to produce a fine scratch having an average particle size of 0.040 inch and the scratch blended to prepare a multicolored blend as follows:

| | Percent by weight |
|---|---|
| Light gray | 40 |
| Medium gray | 30 |
| Dark gray | 30 |
| | 100 |

This blend was sheeted between a pair of calender rolls, the upper roll at a temperature of 50° F. and the lower roll at a temperature of 110° F. The resulting sheet, the base sheet for use in the invention, had a thickness of 0.045 inch and had a granite type decoration.

Additional batches of fine scratch composition were prepared and blended in the same color proportions as tabulated above using linoleum composition formulated as follows:

| | Percent by weight |
|---|---|
| Linoleum binder | 34 |
| Wood flour | 29 |
| Pigment and filler | 37 |
| | 100 |

This blended fine scratch composition was scattered over about 90 percent of the surface of the base sheet formed against the cooler roll in a thin layer, the amount of scratch being 15 percent by weight of the base sheet over a unit area.

Linoleum composition sheets were prepared in red, white, blue, black, green and yellow with a thickness of 0.072 inch using compositions with 34 percent linoleum binder content. These sheets were cut into irregular pieces having maximum face dimensions of about ¼ inch. The chips were blended with equal proportions of each color in the blend and scattered over the thin layer of fine scratch composition in an amount of 4.5 percent of the surface area of the base sheet. The deposited pieces represented 7 percent by weight of the base sheet over a unit area.

The base sheet having a layer of fine scratch and deposited pieces upon the surface was passed into the nip between two calender rolls, the upper roll at a temperature of 50° F. and the lower roll at a temperature of 250° F. The decorative sheet produced had a thickness of 0.055 inch, 0.010 greater than that of the base sheet, controlled by the spacing between the calender rolls. The rate of sheet travel was constant through the calender.

The decorative sheet was laminated to a sheet of asphalt saturated felt having a thickness of 0.040 inch, and passed through a rotary finishing unit to insure a smooth decorative wearing surface.

The resulting product was cured at 165° F. for 4 weeks to yield a finished linoleum having a wearing surface with a thickness of 0.052 inch, standard gauge. The decoration was non-directional and had a pronounced resemblance to a spatter design effect.

*Example 2*

A base sheet was prepared following the procedure of Example 1 and calendered into a sheet having a thickness of about 0.035 inch. The uncured linoleum base sheet had a percentage penetration of 28 percent.

In a manner similar to that shown in Example 1, linoleum composition chips having a percentage penetration of 18 percent were prepared in green and yellow from a sheet having a thickness of 0.027 inch, by cutting into regular squares of approximately ¼ inch face area. The chips were then blended in equal portions of each color and deposited on the surface of the base sheet in a uniform, single layer. Sufficient chips were utilized to randomly cover about 80 percent of the surface area of the base sheet.

The percentage penetration of the linoleum composition is determined by carrying out a penetration test. In accordance with this test, a 0.25 inch diameter smooth metal cylinder is placed upon a sample of a linoleum composition sheet and a weight of 6 pounds is applied for a period of 60 seconds. This corresponds to a pressure of 122.4 pounds per square inch. At the end of 60 seconds, the amount of penetration of the cylinder into the sheet is measured. When a conventional Randall and Stickney Dial Gauge is used, the amount of penetration can be read directly on a dial at the conclusion of the test. The actual penetration divided by the thickness of the sheet is the percentage penetration at the temperature of the sheet during the test. The term percentage penetration as used in the specification and claims refers to the result of a determination made by the method outlined above.

The base sheet having the decorative chips on its surface is passed into the nip of a finishing unit formed by a large drum and a rubber belt. The drum surface is maintained at a temperature of about 150° F. and the temperature of the sheet when fed to the finishing drum is approximately 80° F. The finishing drum has a diameter of approximately 6 feet and the rubber belt is forced against the drum by a series of small pressure rolls surrounding approximately one-half the circumference of the drum. The pressure on the base sheet and chips is adjusted to allow the production of a sheet having a thickness of about 0.50 inch. The sheet has the chips embedded in its surface with approximately 0.003 inch of the thickness of the chips extending above the surface. The sheet had an unusual decorative textured appearance.

In accordance with the invention, a non-directional terrazzo or spatter design effect can be created in linoleum in a continuous process by calendering. The character of the decoration is preserved during wear of the product after it is installed. The method of the invention is adaptable to the production of linoleum in a wide range of decorative effects merely by changing the shape and distribution of the decorative composition embedded in the base sheet. The decoration can be changed without large extra investment as would be required in producing geometric inlaid products or in the production of linoleum using stencils. The continuous calendering process is carried out without the development of excessive tensions in the base sheet.

Any departure from the above description which conforms to the present invention is intended to be included within the scope of the claims.

What is claimed is:

1. A method of producing an inlaid linoleum composition sheet having a non-directional multicolored decoration, which comprises depositing a thin, uniform layer of fine granules of linoleum composition uniformly over about 75 percent to 100 percent of one surface of a preformed, uncured linoleum composition base sheet, said granules having a maximum face dimension of about 0.02 to about 0.06 inch, depositing larger chips of linoleum composition upon said layer of granules uniformly over about 1 percent to about 20 percent of said layer, said chips having a maximum face dimension of about 0.1 to about 1 inch and having a thickness of about 0.75 to about 2 times the thickness of said base sheet and said granules and said chips are formulated with a lower binder content linoleum composition than the composition of said base sheet, and passing said base sheet with said granules and chips deposited on said surface between a pair of calender rolls, said rolls being spaced apart a distance of about 0.005 to about 0.020 inch greater than the thickness of said base sheet thereby embedding said granules and chips into said base sheet and integrally bonding them thereto to form said non-directional decoration, the spacing between said rolls being controlled in accordance with the volume of granules and pieces deposited upon said surface so that the embedding takes place without gauge reduction of said base sheet.

2. The method according to claim 1 wherein said base sheet has a granite decoration formed by sheeting fine scratch linoleum composition in a range of colors equivalent to the multi-colored decoration desired in the linoleum composition product sheet.

3. A method of producing an inlaid linoleum composition sheet having a non-directional multicolored decoration, which comprises depositing a thin single layer of small chips uniformly over about 75 percent to 100 percent of one surface of a preformed, uncured linoleum composition base sheet, said chips having a maximum face dimension of about 0.1 to about 1 inch, a thickness of about 0.75 to about 2 times the thickness of the base sheet and formulated with a lower binder content linoleum composition than the composition of said base sheet, and passing said base sheet and chips deposited on said surface between a pair of calender rolls, said rolls being spaced apart a distance of about 0.005 to about 0.020 inch greater than the thickness of said base sheet thereby embedding said chips into said base sheet and integrally bonding them thereto to form said non-directional decoration, the spacing between said rolls being controlled in accordance with the volume of granules and pieces deposited upon said surface so that the embedding takes place without gauge reduction of said base sheet.

4. The method of claim 3 wherein the hardness of the composition of said uncured linoleum base sheet is such that the composition has a percentage penetration greater than about 22 percent and the hardness of the composition of said chips is such that the composition has a percentage penetration of about 14 percent to about 22 percent.

5. The method of claim 1 wherein one of the rolls of said pair of calender rolls contacts said granules and chips and is maintained at a temperature between about 40° F. to about 90° F. and the other roll contacting the opposite surface of the sheet is maintained at a temperature between about 200° F. and 275° F.

References Cited by the Examiner
UNITED STATES PATENTS

| | | | |
|---|---|---|---|
| 1,912,581 | 6/33 | Humphreys | 18—5 |
| 2,888,975 | 6/59 | Benedict | 156—303 |
| 2,987,104 | 6/61 | Benedict | 156—298 |
| 3,078,510 | 2/63 | Rowe | 156—298 |

EARL M. BERGERT, *Primary Examiner.*